(12) United States Patent
Abraham

(10) Patent No.: US 11,647,058 B2
(45) Date of Patent: May 9, 2023

(54) SCREEN, VIDEO, AUDIO, AND TEXT SHARING IN MULTIPARTY VIDEO CONFERENCES

(71) Applicant: Avaya Management L.P., Durham, NC (US)

(72) Inventor: Jinson Abraham, Stittsville (CA)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/408,216

(22) Filed: Aug. 20, 2021

(65) Prior Publication Data

US 2023/0054044 A1 Feb. 23, 2023

(51) Int. Cl.
| | | |
|---|---|---|
| G06F 15/16 | (2006.01) | |
| H04L 65/1083 | (2022.01) | |
| H04L 65/403 | (2022.01) | |
| G06F 9/54 | (2006.01) | |
| G06F 9/451 | (2018.01) | |
| H04L 12/18 | (2006.01) | |

(52) U.S. Cl.
CPC .......... *H04L 65/1083* (2013.01); *G06F 9/452* (2018.02); *G06F 9/547* (2013.01); *H04L 12/1822* (2013.01); *H04L 65/403* (2013.01)

(58) Field of Classification Search
CPC ............. H04L 65/1083; H04L 12/1822; H04L 65/403; G06F 9/452; G06F 9/547

USPC .......................................................... 709/204
See application file for complete search history.

(56) References Cited

U.S. PATENT DOCUMENTS

| | | | |
|---|---|---|---|
| 10,084,987 B2 | 9/2018 | Pinheiro | |
| 11,258,836 B1* | 2/2022 | Ou | ............ H04N 7/15 |
| 11,330,026 B1* | 5/2022 | Han | ........ H04L 65/611 |
| 2011/0154192 A1 | 6/2011 | Yang et al. | |
| 2013/0055113 A1* | 2/2013 | Chazin | ................ H04L 12/1822 |
| | | | 715/758 |
| 2014/0258406 A1* | 9/2014 | Salesky | ................... H04L 67/32 |
| | | | 709/204 |
| 2015/0033149 A1* | 1/2015 | Kuchoor | ............ H04N 21/4782 |
| | | | 715/753 |
| 2019/0166330 A1* | 5/2019 | Ma | ......................... H04L 65/403 |
| 2021/0385262 A1* | 12/2021 | Kumata | ................. H04N 7/152 |
| 2022/0053165 A1* | 2/2022 | Maini | .................. G06V 40/174 |

* cited by examiner

*Primary Examiner* — Lan Dai T Truong
(74) *Attorney, Agent, or Firm* — Sheridan Ross P.C.

(57) ABSTRACT

The present disclosure provides, among other things, methods including: initiating a conference call with a plurality of participants; receiving a first request to view at least a first screen share of a first participant and a second screen share of a second participant at a first same time on a device of a third participant, where the plurality of participants includes the first participant, the second participant, and the third participant; and displaying the first screen share and the second screen share at the first same time on a display of the device of the third participant.

20 Claims, 9 Drawing Sheets

SCREEN, VIDEO, AUDIO, AND TEXT SHARING IN MULTIPARTY VIDEO CONFERENCES

FIELD OF THE DISCLOSURE

Embodiments of the present disclosure relate generally to systems and methods for multi-participant video conferencing and more particularly to systems and methods for screen sharing during a video conference.

BACKGROUND

Screen sharing means that a single participant shares the content on their screen in real-time to other devices during a video conference so that other participants of the video conference can view the content of the single participant's screen. In multi-participant video conferencing, a participant may share their screen with one participant or all other participants; however, only one screen share at a time may be viewed by any of the participants.

SUMMARY

In video conferencing, screen sharing has its limitations because a participant may view the screen of only one other participant at a time. In other words, a viewing participant must end the viewing session (e.g., a screen share) with a first participant in order to begin a viewing session with a second participant. This is burdensome due to the required actions and system processing time, as well as being problematic because it slows down communication times between the participants. Also, if a participant shares their screen, it is typically shared to all participants within a video conference. Thus, if a participant wants to see the screens of multiple participants, they must switch between each participant's screen share (e.g., to view the contents of each participant's screen) in order to see one screen at a time.

Current video conference capabilities are problematic because it is not possible to view multiple participants screens at a same time in real time, and it is also not possible for a participant in the video conference to share their screen with only one viewing participant to be viewed at any timing that the viewing participant desires during the video conference. Another limitation of screen sharing in video conferencing is that if a participant is using more than one screen at a same time, it is not possible for another conference participant to view multiple screens of a single participant at a same time. These and other needs are addressed by the various embodiments and configurations of the present disclosure.

The present disclosure can provide a number of advantages depending on the particular configuration. For example, in various embodiments of the disclosure, a participant may view multiple screen shares of other participants in a video conference at a same time. In some embodiments, a participant may be notified if one participant is using more than one screen during the video conference, and the participant may be able to view screen shares of each of the multiple screens of the one participant. Screen shares are entirely configurable (e.g., a participant may view all of the screen shares of every participant at a same time and including screen shares of any multiple screens used by any one or more participants, a participant may view less than all screen shares and may choose which screen shares to view in any order on the display at any time, and a participant may view any combination of screen shares and video feeds of the participants.

Participants may record any aspect of the video conference; thus, participants may record any data (including not only audio, video, and/or text, but also any screen shares) provided during the video conference. Any combination of audio, video, text, and screen shares may be recorded regardless of what the moderator is viewing (or how the moderator is otherwise accessing any audio, video, text, and/or screen shares) and regardless of how the audio, video, text, and screen shares are being managed. These and other advantages will be apparent from the disclosure contained herein.

Systems and methods disclosed herein refer to a video conference having multiple participants. Participants of a video conference are persons who are connected to one another via one or more channels in order to conduct the video conference. Participants may be referred to herein as users, viewers, and speakers, and include people, persons, callers, callees, recipients, senders, receivers, contributors, humans, agents, administrators, moderators, organizers, experts, employees, members, attendees, teachers, students, and variations of these terms. Thus, in some aspects, although the embodiments disclosed herein may be discussed in terms of certain participants, the embodiments include video conferences between any type and number of users including people having any type of role or function. In addition, although participants may be engaged in a video conference, they may be using only certain channels to participate. For example, one participant may have video and audio enabled, so that other participants can both see and hear them. Another participant may have only their video enabled (e.g., they may have their microphone muted) so that other participants can only see them or may have only audio enabled so that other participants can only hear them. In other words, participants may connect to a video conference using any channel or combination of channels. Even if a participant does not have their video channel enabled, they may still provide their screen share to other participants.

A participant's display may be referred to herein as a screen, a layout, and a configuration, as well as variations of these terms. A display may show other participants' video channels (e.g., a video feed) and/or screen(s) (e.g., one or more screen shares) and the screens shown on a display may be referred to herein as a window, a participant display, a display within a video conference, a display associated with a video conference, and variations of these terms.

Embodiments of the present disclosure advantageously provide methods and systems that actively manage some or all of a video conference. Managing may be done automatically, or by one or more of the participants of the video conference. Managing can include monitoring, detecting, and analyzing, and may determine if a display and/or recordings should be managed (e.g., if changes should be made to a display and/or if a recording should be started or stopped). The video conference may be monitored for any information related to one or more of the participants and/or the video conference itself.

As used herein, managing (and variations of the term, such as "management") includes any managing action such as analyzing, processing, determining, deciding, comparing, updating, changing, sending, receiving, adding, removing, and/or editing. Thus, managing a video conference can include determining, configuring, changing, and/or updating one or more displays and/or channels; configuring and managing one or more screen share channels; starting or stopping one or more recordings; configuring automatic actions or partially automatic actions, monitoring for screens in use, and detecting and notifying that screens are in use (including more than one screen per participant that is in use); and actions based on the managing (e.g., notifying a moderator based on a detection of screen use).

According to some aspects of the present disclosure, methods include: initiating, by a processor, a conference call with a plurality of participants; receiving, by the processor, a first request to view at least a first screen share of a first participant and a second screen share of a second participant at a first same time on a device of a third participant, where the plurality of participants includes the first participant, the second participant, and the third participant; and displaying, by the processor, the first screen share and the second screen share at the first same time on a display of the device of the third participant.

In some embodiments, the first same time is in real time and during the conference call.

In some embodiments, the third participant is a moderator of the conference call, and where the moderator sends the first request.

Some aspects further include detecting that the first participant is using more than one screen at the first same time and notifying the third participant of the more than one screen.

Some aspects further include receiving a second request, by the third participant, to view a third screen share of the more than one screen; and displaying, by the processor, the third screen share together with the first screen share and the second screen share on the device of the third participant.

In some embodiments, the first request is to view all screen shares of every one of the participants in the plurality of participants at a second same time on the device of the third participant, where the all screen shares include the first screen share, the second screen share, and at least a third screen share.

Some aspects further include after the displaying at the first same time, detecting that the first participant is using at least a first screen and a second screen at a second same time and notifying the third participant of the first participant using the at least the first screen and the second screen at the second same time.

Some aspects further include receiving a second request, by the third participant, to view a fourth screen share of the first screen and a fifth screen share of the second screen; and displaying, by the processor, the fourth screen share and the fifth screen share together with the first screen share and the second screen share on the device of the third participant at the third same time, where the third same time is in real time.

In some embodiments, a moderator sends the first request, and some aspects further include after the displaying at the first same time, receiving a second request to view all screen shares of every one of the participants in the plurality of participants at a second same time on the device of the third participant, where the all screen shares include the first screen share, the second screen share, and at least a third screen share; and displaying the first screen share, the second screen share, and at least the third screen share on the device of a third participant in real time during the conference call.

Some aspects further include receiving a second request to start recording the conference call, where the recording includes a recording of the display of the device of the third participant displaying the first screen share and the second screen share at the first same time.

In some embodiments, the first request specifies to view only some screen shares of all screens being used by the plurality of participants.

In some embodiments, the first request further includes to view a video feed of the first participant together with the first screen share and the second screen share at the first same time on the display of the device of the third participant.

According to some aspects of the present disclosure, systems include: a processor; and a memory coupled with and readable by the processor and having stored therein a set of instructions which, when executed by the processor, causes the processor to manage a conference call by: initiating a conference call with a plurality of participants; receiving a first request to view at least a first screen share of a first participant and a second screen share of a second participant at a first same time on a device of a third participant, where the plurality of participants includes the first participant, the second participant, and the third participant; and displaying the first screen share and the second screen share at the first same time on a display of the device of the third participant.

In some embodiments, a recording of aspects of the conference call may be managed. For example, any or all computer data (also referred to herein as "data"), including any or all screen shares (and/or any or all audio, and/or any or all video, and/or any or all text) may be recorded during the conference call. The recording(s) may be managed independently of any content being provided to one or more conference call participants.

In some embodiments, the first same time is in real time and during the conference call.

In some embodiments, the third participant is a moderator of the conference call, and where the moderator sends the first request.

Some aspects further include detecting that the first participant is using more than one screen at the first same time and notifying the third participant of the more than one screen.

Some aspects further include receiving a second request, by the third participant, to view a third screen share of the more than one screen; and displaying, by the processor, the third screen share together with the first screen share and the second screen share on the device of the third participant.

In some embodiments, the first request is to view all screen shares of every one of the participants in the plurality of participants at a second same time on the device of the third participant, where the all screen shares include the first screen share, the second screen share, and at least a third screen share.

Some aspects further include after the displaying at the first same time, detecting that the first participant is using at least a first screen and a second screen at a second same time and notifying the third participant of the first participant using the at least the first screen and the second screen at the second same time.

According to some aspects of the present disclosure, a non-transitory computer-readable medium includes a set of instructions stored therein, when executed by a processor, causes the processor to manage a conference call by: initiating a conference call with a plurality of participants; receiving a first request to view at least a first screen share of a first participant and a second screen share of a second participant at a first same time on a device of a third participant, where the plurality of participants includes the first participant, the second participant, and the third participant; and displaying the first screen share and the second screen share at the first same time on a display of the device of the third participant.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of some embodiments that are entirely hardware, some embodiments that are entirely software (including firmware, resident software, micro-code, etc.) or some embodiments combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The terms "conference" and "video conference" as used herein refer to any communication or set of communications, whether including audio, video, text, or other multi-media data, between two or more communication endpoints and/or users. Although one or more users may be using and/or sharing one or multiple types of data, other conference participants may be using and/or sharing the same or other types of data. Any combinations of data may be used and/or shared in a conference. For example, some participants to a video conference may be participating via video and audio, others may be participating via audio only, and still others may be participating via video and text only, or text only. Thus, embodiments described herein are applicable to any configuration of conference. Typically, a conference includes three or more communication endpoints. The terms "conference," "video conference," and "conference call" are used interchangeably throughout the specification.

The term "communication device" or "communication endpoint" as used herein refers to any hardware device and/or software operable to engage in a communication session. For example, a communication device can be an Internet Protocol (IP)-enabled phone, a desktop phone, a cellular phone, a personal digital assistant, a soft-client telephone program executing on a computer system, etc. IP-capable hard- or softphone can be modified to perform the operations according to embodiments of the present disclosure. Examples of suitable modified IP telephones include the 5600™, 9620™, 9630™, 9640™, 9640G™, 9650™, and Quick Edition telephones and IP wireless telephones of Avaya, Inc.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIG. 1. Generally, a network can be a LAN, a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "database" or "data model" as used herein refers to any system, hardware, software, memory, storage device, firmware, component, etc., that stores data. The data model can be any type of database or storage framework which is stored on any type of non-transitory, tangible computer readable medium. The data model can include one or more data structures, which may comprise one or more sections that store an item of data. A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The term "computer-readable medium" as used herein refers to any tangible storage and/or transmission medium that participate in providing instructions to a processor for execution. The computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, etc. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of illustrative embodiments, it should be appreciated that an individual aspect of the disclosure can be separately claimed.

DETAILED DESCRIPTION

Figure 1:
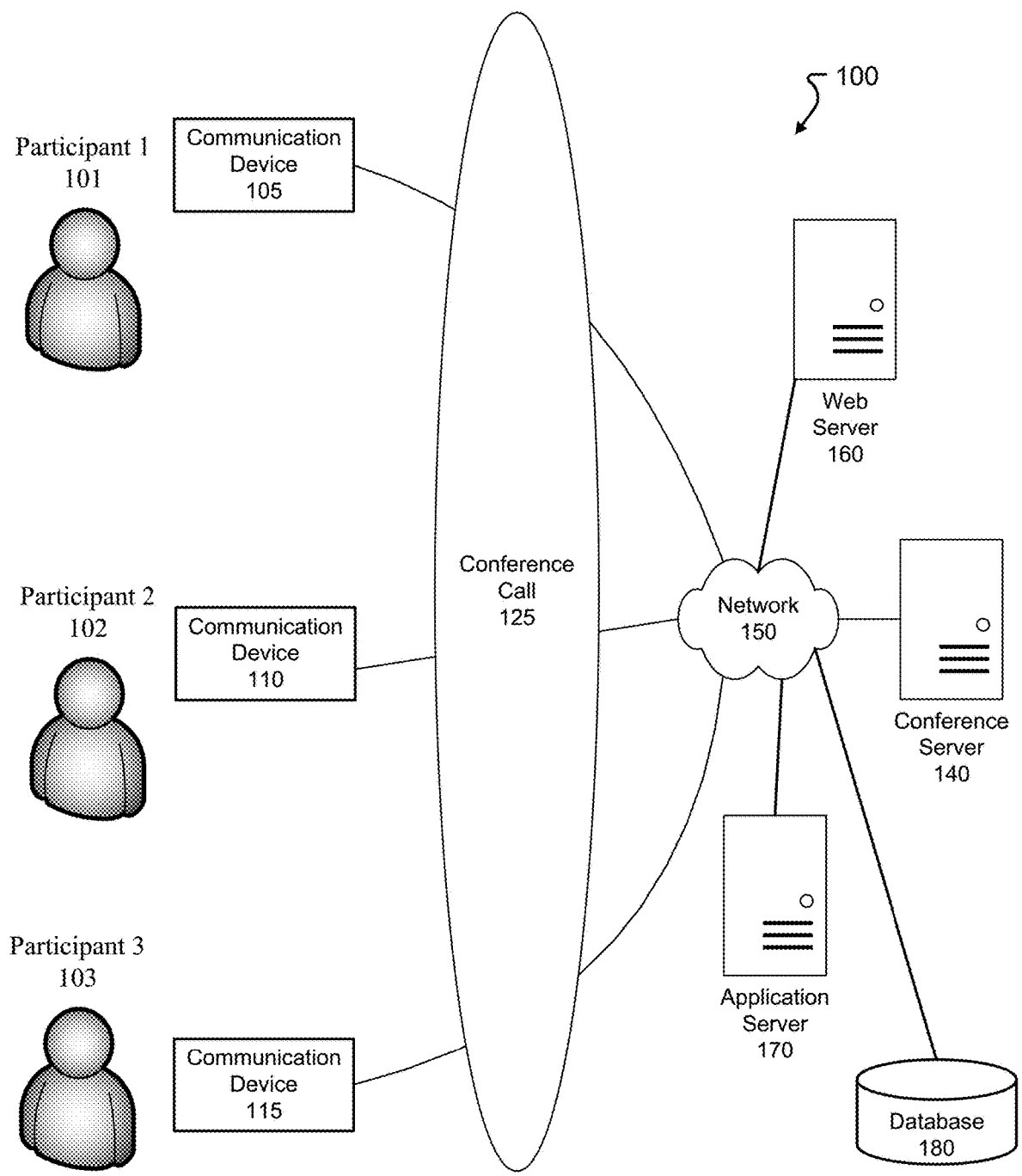
FIG. 1 shows an illustrative first block diagram in accordance with various embodiments of the present disclosure.

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The illustrative systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

While the illustrative aspects, embodiments, and/or configurations illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

In yet further embodiments, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Illustrative hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Corte™-M processors, ARM® Cortex-A and ARIVI926EJ-S™ processors, other industry-equivalent processors, and may perform computational functions using any known or future-developed standard, instruction set, libraries, and/or architecture.

In yet further embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In still further embodiments of the present disclosure, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

FIG. 1 is a block diagram of an illustrative computing environment 100 for managing participants to a video conference call according to embodiments of the present disclosure. The illustrative system 100 includes a plurality of users (e.g., a first user 101, a second user 102 and a third user 103), a plurality of communication devices 105, 110, 115, a conference call 125, a network 150, a conference server 140, a web server 160, an application server 170, and database 180. According to some embodiments of the present disclosure, the conference call 125 is supported by the conference server 140. Although some users (e.g., participants) may be participating as a video conference call, one or more of the users on the conference call may be participating as only an audio call or only a data call, or using a combination of any two of video, audio, and data communication.

Communication devices 105, 110, 115 can be or may include any user communication endpoint device that can communicate over the network 150 providing one-way or two-way audio and/or video communication with other communication devices and the conference server 140. The communication devices 105, 110, 115 may include general purpose personal computers (including, merely by way of example, personal computer (PC)s, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These communication devices 105, 110, 115 may also have any of a variety of applications, including for example, database client and/or server applications, and web browser applications. Alternatively, the communication devices 105, 110, 115 may be any other electronic device, such as a thin-client computer, Internet-enabled mobile telephone, video system, a cellular telephone, a tablet device, a notebook device, an iPad, a smartphone, a personal digital assistant (PDA), and/or the like. capable of communicating via a network 150 and/or displaying and navigating web pages or other types of electronic documents or information. Although the illustrative system 100 is shown with three communication devices, any number of user communication devices may be supported.

The communication devices 105, 110, 115 are devices where a communication session ends. The communication devices 105, 110, 115 are not network elements that facilitate and/or relay information in the network, such as a communication manager or router. In some embodiments of the present disclosure, the communication devices 105, 110, 115 are portable (e.g., mobile) devices. In other embodiments, the communication devices 105, 110, 115 are stationary devices. In further embodiments of the present disclosure, the communication devices 105, 110, 115 are a combination of portable device and stationary devices. The communication devices 105, 110, 115 may provide any combination of several different types of inputs and/or output, such as speech only, speech and data, a combination of speech and video, or a combination of speech, data and video. Information communicated between the communication devices 105, 110, 115 and/or the conference server 140 may include control signals, indicators, audio information, video information, and data.

Network 150 can be or may include any collection of communication equipment that can send and receive electronic communications, such as the Internet, a Wide Area Network (WAN), a Local Area Network (LAN), a VoIP network, the Public Switched Telephone Network (PSTN), a packet switched network, a circuit switched network, a cellular network, a combination of these, and the like. Network 150 can use a variety of electronic protocols, such as Ethernet, IP, Session Initiation Protocol (SIP), Integrated Services Digital Network (ISDN), email protocols, text messaging protocols (e.g., Short Message Service (SMS)), and/or the like. Thus, network 150 is an electronic communication network configured to carry messages via packets and/or circuit switched communications.

As mentioned above, system 100 includes one or more servers 140, 160, 170. According to some embodiments of the present disclosure, server 140 is shown as a conference server, server 160 is shown as a web server and server 170 is shown as an application server. The web server 160 may be used to process requests for web pages or other electronic documents from communication devices 105, 110, 115. The web server 160 can be running an operating system including any of those discussed above, as well as any commercially-available server operating systems. The web server 160 can also run a variety of server applications, including SIP (Session Initiation Protocol) servers, HTTP(s) servers, FTP servers, CGI servers, database servers, Java® servers, and the like.

The file and/or application server 170, in addition to including an operating system, includes one or more applications accessible by a client running on one or more of the communication devices 105, 110, 115. The server(s) 160 and/or 170 may be one or more general purpose computers capable of executing programs or scripts in response to the communication devices 105, 110, 115. As one example, the servers 160, 170 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server 170 may also include database servers, including without limitation those commercially available from Oracle®, Microsoft®, Sybase®, IBM® and the like, which can process requests from database clients running on a communication device 105, 110, 115.

The web pages created by the server 160 and/or 170 may be forwarded to a communication device 105, 110, 115 via a web (file) server 160, 170. Similarly, the web server 160 may be able to receive web page requests, web services invocations, and/or input data from a communication device 105, 110, 115 (e.g., a user computer, etc.) and can forward the web page requests and/or input data to the web (application) server 170. In further embodiments, the server 170 may function as a file server. Although for ease of description, FIG. 1 illustrates a separate web server 160 and file/application server 170, those skilled in the art will recognize that the functions described with respect to servers 160, 170 may be performed by a single server and/or a plurality of specialized servers, depending on implementation-specific needs and parameters. The communication devices 105, 110, 115, web (file) server 160 and/or web (application) server 170 may function as the system, devices, or components described herein.

The database 180 may reside in a variety of locations. By way of example, database 180 may reside on a storage medium local to (and/or resident in) one or more of the communication devices 105, 110, 115 Alternatively, it may be remote from any or all of the communication devices 105, 110, 115, and in communication (e.g., via the network 150) with one or more of these. For example, in various embodiments, database 180 may reside on a storage medium local to (and/or resident in) one or more of the servers 140, 160, 170. The database 180 may reside in a storage-area network ("SAN"). Similarly, any necessary files for performing the functions attributed to the communication devices 105, 110, 115 may be stored locally on the respective computer and/or remotely, as appropriate. The database 180 may be a relational database, such as Oracle 20i®, that is adapted to store, update, and retrieve data in response to SQL-formatted commands.

Figure 2:
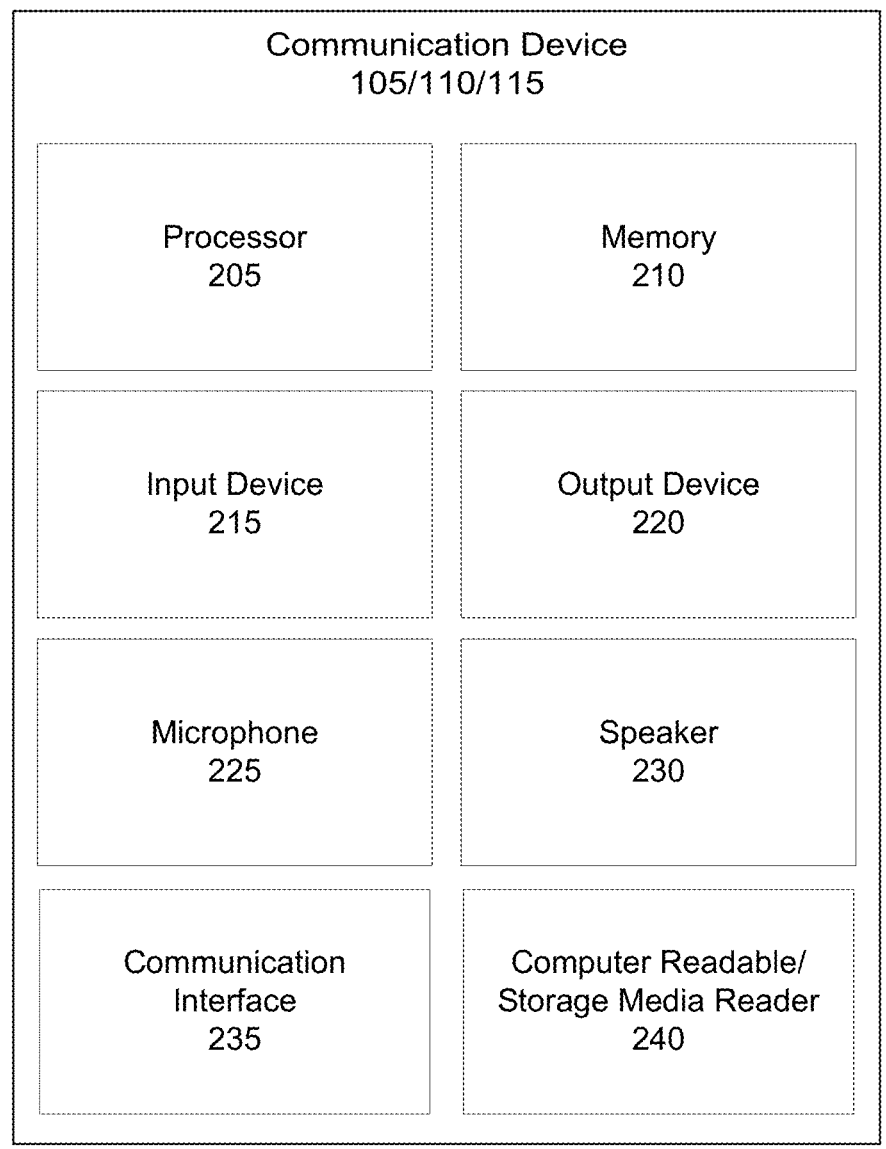
FIG. 2 shows an illustrative second block diagram in accordance with various embodiments of the present disclosure.

FIG. 2 is a block diagram of an illustrative communication device 105, 110, 115 used for managing participants in a conference call according to embodiments of the present disclosure. The communication device 105, 110, 115 may include a processor 205, a memory 210, an input device 215, an output device 220, a microphone 225, a speaker 230, a communication interface 235 and a computer-readable storage media reader 240. The communication device 105, 110, 115 may include a body or an enclosure, with the components of the communication device 105, 110, 115 being located within the enclosure. In various embodiments of the present disclosure, the communication device 105, 110, 115 includes a battery or power supply for providing electrical power to the communication device 105, 110, 115. Moreover, the components of the communication device 105, 110, 115 are communicatively coupled to each other, for example via a communications link such as a network (not illustrated).

The processor 205, in some embodiments of the present disclosure, may include any known controller capable of executing computer-readable instructions and/or capable of performing logical operations. For example, the processor 205 may be a microcontroller, a microprocessor, a central processing unit (CPU), a graphics processing unit (GPU), an auxiliary processing unit, or similar programmable controller. In some embodiments of the present disclosure, the processor 205 executes instructions stored in the memory 210 to perform the methods and routines described herein. The processor 205 is communicatively coupled to the memory 210, the input device 215, the output device 220, the microphone 225, the speaker 230, and the communication interface 235.

The memory 210, in some embodiments of the present disclosure, is a computer readable storage medium. In some embodiments of the present disclosure, the memory 210 includes volatile computer storage media. For example, the memory 210 may include a random-access memory (RAM), including dynamic RAM (DRAM), synchronous dynamic RAM (SDRAM), and/or static RAM (SRAM). In some embodiments of the present disclosure, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments of the present disclosure, the memory 210 stores data relating to managing a conference call. For example, the memory 210 may store physical locations associated with the conference call, devices participating in the conference call, statuses and capabilities of the participating devices, and the like. In some embodiments of the present disclosure, the memory 210 also stores program code and related data, such as an operating system operating on the communication device 105, 110, 115. In some embodiments of the present disclosure, the memory 210 stores program code for a conferencing client used to participate in the conference call.

The input device 215, in some embodiments of the present disclosure, may comprise any known computer input device including a touch panel, a button, a keypad, and the like. In certain embodiments of the present disclosure, the input device 215 includes a camera for capturing image data. In some embodiments of the present disclosure, a user may input instructions via the camera using visual gestures. In some embodiments, the input device 215 (or portions thereof) may be integrated with the output device 220, for example, as a touchscreen or similar touch-sensitive display. In some embodiments, the input device 215 comprises two or more different devices, such as a camera and a touch panel.

The output device 220, in some embodiments of the present disclosure, is configured to output visual, audible, and/or tactile signals. In some embodiments of the present disclosure, the output device 220 includes an electronic display capable of outputting visual data to a user. For example, the output device 220 may include a liquid crystal display (LCD) display, a light emitting diode (LED) display, an organic LED (OLED) display, a projector, or similar display device capable of outputting images, text, or the like to a user. In certain embodiments of the present disclosure, the output device 220 includes one or more speakers for producing sound. In some embodiments of the present disclosure, the output device 220 includes one or more tactile devices for producing vibrations, motion, or other tactile outputs.

According to some embodiments of the present disclosure, all or portions of the output device 220 may be integrated with the input device 215. For example, the input device 215 and output device 220 may form a touchscreen or similar touch-sensitive display.

The microphone 225, in some embodiments of the present disclosure, comprises at least one input sensor (e.g., microphone transducer) that converts acoustic signals (sound waves) into electrical signals, thereby receiving audio signals. In various embodiments of the present disclosure, the user inputs sound or voice data (e.g., voice commands) via a microphone array. Here, the microphone 225 picks up sounds (e.g., speech) from one or more conference call participants.

The speaker 230, in some embodiments of the present disclosure, is configured to output acoustic signals. Here, the speaker 230 produces audio output, for example of a conversation or other audio content of a conference call.

The communication interface 235 may include hardware circuits and/or software (e.g., drivers, modem, protocol/network stacks) to support wired or wireless communication between the communication device 105, 110, 115 and another devices or networks, such as the network 150. Here, the communication interface 235 is used to connect the communication device 105, 110, 115 to the conference call. A wireless connection may include a mobile (cellular) telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™. Alternatively, the wireless connection may employ a ZigBee® connection based on the IEEE 802 standard. In some embodiments, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The computer-readable storage media reader 240 can further be connected to a computer-readable storage medium, together (and, optionally, in combination) with memory 210 comprehensively representing remote, local, fixed, and/or removable storage devices plus storage media for temporarily and/or more permanently containing computer-readable information. The communications interface 235 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

Figure 3:
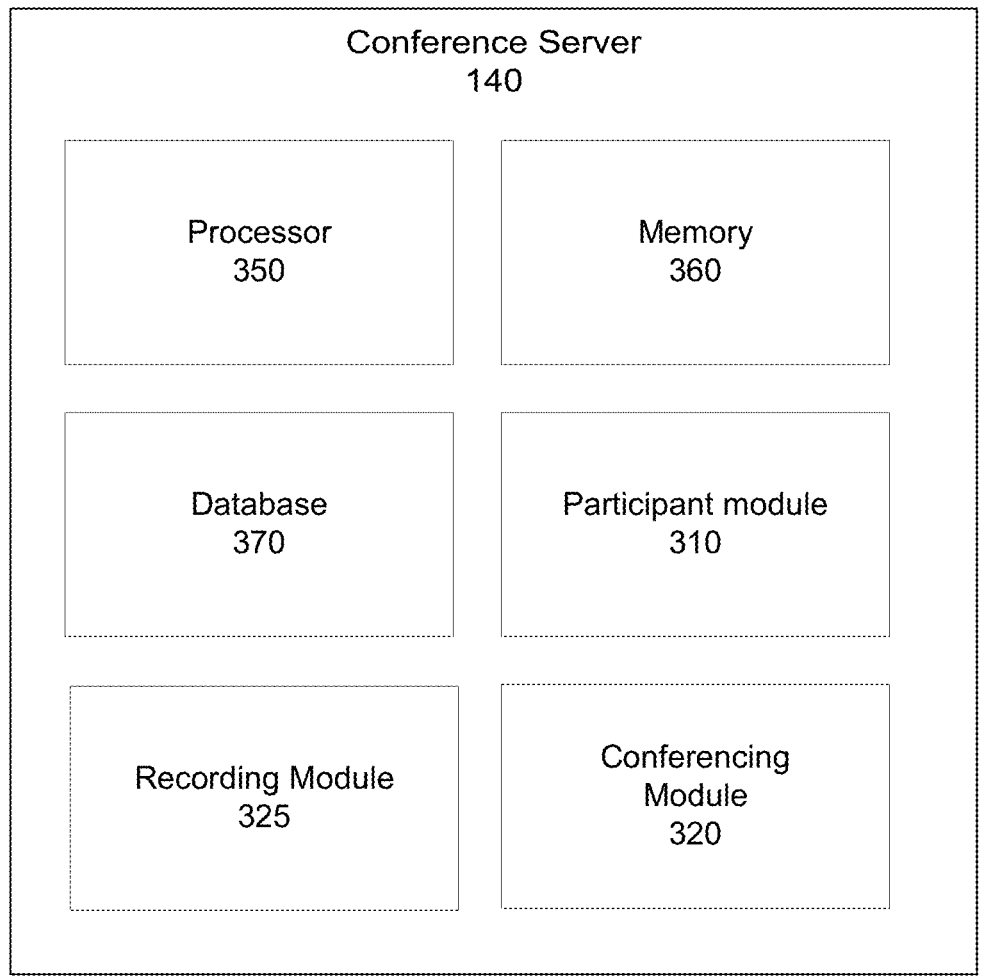
FIG. 3 shows an illustrative third block diagram in accordance with various embodiments of the present disclosure.

FIG. 3 is a block diagram of an illustrative conference server 140 used for managing participants to a conference call according to some embodiments of the present disclosure. The conference server 140 can include a PBX, an enterprise switch, an enterprise server, or other type of telecommunications system switch or server, as well as other types of processor-based communication control devices such as media servers (e.g., email servers, voicemail servers, web servers, and the like), computers, adjuncts, etc. The conference server 140 may be configured to execute telecommunication applications such as Avaya Inc.'s Aura™ Media Server, Experience Portal, and Media Platform as a Service (MPaaS). These products may require the participants to dial into a conference bridge using a predetermined dial-in number and access code to initiate conferences, without an operator or advanced reservations. As will be appreciated, these products further provide integrated features such as audio and web conference management, desktop sharing, polling, interactive whiteboard session, chat, application sharing, conference recording and playback of audio and web portions of the conference, and annotation tools.

The conference server 140 can be or may include any hardware coupled with software that can manage how a conference call is conducted and may include a conference bridge, for example. As depicted, the conference server 140 includes a processor 350, a memory 360, a database 370 and one or more of a plurality of modules including a participant module 310, a recording module 325, and a conferencing module 320. The modules may be implemented as hardware, software, or a combination of hardware and software (e.g., processor 350, memory 360 and database 370).

Processor 350 and memory 360 are similar to processor 205 and memory 210, respectively, as illustrated in FIG. 2 and discussed herein, and database 370 is similar to database 180 as illustrated in FIG. 1 and discussed herein.

The participant module 310 according to some embodiments of the present disclosure, is configured to include identifying information about a participant to the conference call. According to some embodiments of the present disclosure, each participant to the conference call is registered as a user to at least one conference provided by the conference server 140. According to some embodiments of the present disclosure, a registered user previously provides identifying information about the user (e.g., a name, a user identity, a unique identifier (ID), an email address, a telephone number, an IP address, etc.), in memory 360 or database 370. Generally, when a user is invited to a conference call or creates a conference call to become a participant, the user receives a set of information, such as a telephone number and access code or a web conference link, to join the conference. According to some embodiments of the present disclosure, when the time of the conference arrives, the user and the other invited participants must first access the conference dial-in or other information to join the conference. In some embodiments, information about devices of the user may be provided and saved in memory 360 or database 370, and this information may be used to determine if the user is active on more than one screen while in a conference call.

The recording module 325 according to some embodiments of the present disclosure, is configured to record during the conference call. As discussed herein, the recording module 325 can record any type of information and/or data content, including any audio content and/or any video content, and/or any screen share content.. The content being recorded can include participant videos (e.g., a video feed, such as a webcams) and/or screen share information and may be recorded as it is shown on a display (e.g., any information that is shown at a same time (including multiple screen shares and any one or more video feeds together with audio and/or data feeds) on a moderator's display may be recorded as it is shown on the display). The recording module 325 can be managed automatically (e.g., automatically recording during certain conference calls) and/or by one or more of the participants of the conference call. For example, a moderator of a conference call can start and stop recording during the conference call at any time. Similar to determining which screen shares to display, a moderator of a conference call can determine which screen shares to record during the conference call. In some embodiments, a moderator may only choose to receive certain data (e.g., viewing any screen share content and video content of a single participant together on a single screen at a same time while listening to audio content of all conference participants) while recording other data (e.g., recording all screen share and video content of all participants during the video conference). Recordings can be saved to a database such as database 370.

The database 370 may include a record for each user, which record indicates its name, credentials, network address of the communication devices, presence information, information associated with recordings related to the user including recordings of the user, and so on. The database 370 may also include permission information about participants' screen sharing. For example, permission information enables participants to automatically share their screens with another participant (e.g., a moderator or teacher). The database 370 stores information about any conference calls that are in progress. For example, the database 370 includes a record for each conference call (in progress), and the record indicates its participants; in turn, for each participant the record indicates the network address of the communication devices, any current modes or settings of channels (mute/unmute, webcam on/off, etc.), and/or statuses of devices (e.g., devices or screens in use). The database 370 may also include a record for each user, which record indicates its name, credentials, network address of communication devices, presence information (including on any one or more devices), and so on. In various embodiments, information from database 370 may be used by conferencing module 320 to perform a bridge function that mixes the signals from each of the participants to the conference call and manages signals of different channels (e.g., video, audio, data, and/or screen share channels) in order to deliver content to a participant (e.g., a moderator) of the conference call.

The conferencing module 320, according to some embodiments of the present disclosure, provides a conference call service to users of the communication devices by managing conference calls that are in progress. The conferencing module 320 cooperates with participant module 310 and database 370 which stores information about persons registered as users to the conference server 140 and/or devices associated with the users. The conferencing module 320 may configure information based on information from the participant module 310 and database 370 in order to implement embodiments described herein. For example, the conferencing module 320 may automatically configure and manage screen sharing based on permission information for participants of a video conferencing call in order to configure a screen share channel and screen share information accessible to a participant and displayed on a device.

The conferencing module 320 may receive input from one or more of the participants before, during, and/or after a conference call to manage the conference call. For example, a participant (e.g., a moderator) of a conference call may choose to configure (via providing input to the conferencing module 320) a display of information related to participants in any manner, such as showing the screen shares and playing audio feeds of groups of participants, showing screen shares together with video and audio feeds from each of the participants in chosen groups of participants, etc. A moderator may control which participants receive which channel(s), and may change this configuration at any point in the conference. In various embodiments, a screen share channel may be available to only the moderator so that other participants may not view the screen shares (e.g., one or more channels may be received by only the moderator so that only the moderator, and not any other participants of the conference may access the channel(s)). In some embodiments, the moderator (e.g., via the conferencing module 320) may control which participants of a conference may receive which channel(s). In various embodiments, the moderator may receive audio, video, and screen share content of each of the participants (configurable to view in any manner desired) while every other participant of the conference may only receive audio and video content. In further embodiments, the moderator may select one or more screen share contents (and/or video content) to share with one or more other participants.

Classifications of the participants (e.g., a participant who is a moderator, proctor, or teacher, and participants who are students) may be determined based on information about the persons stored in the database 370. Rules associated with the classifications may be managed and implemented by the conferencing module 320. For example, only participants who have specified information (e.g., a specified classification) associated with their user information may have access to a screen share channel and the ability to manage screen share information and the screen share channel. Such embodiments are advantageous because they limit which participants may view and manage screen shares of participants. A participant (e.g., a moderator) may change the management of the video conference call at any time (e.g., the moderator may switch what is shown on the display to view information related to different groups of participants at different times on the display, to start or stop recordings, to adjust what information is being recorded, etc.). In various embodiments, some or all conference data (e.g., one or more channels) may be received by only a moderator of the conference, and the moderator may control which participants receive which data (e.g., channel(s)).

In some embodiments, the conferencing module 320 may manage the video conference call using two channels, such as an audio and video (e.g., audio/video or A/V) channel and a screen share channel. In other words, video and audio information of participants may be transmitted through the audio/video channel, and screen share information of participants may be transmitted through the screen share channel. Only one participant of the video conference call (e.g., a moderator) may manage the screen share channel via the conferencing module 320. In some embodiments, the moderator can view all screen shares of each participant (e.g., all individual screens of each participant) while also viewing information from an audio and video channel. Thus, advantageously, a moderator can view the screens of participants who are sharing their screens at a same time. In addition, in various embodiments, a moderator can receive the audio/video channel feed at a same time as receiving a screen share feed in order to view screen shares of multiple participants of the video conference call.

The conferencing module 320 can determine whether a participant is using more than one screen during the video conference call, and manage notifications of multiple screens (e.g., to a moderator) and screen sharing of multiple screens. For example, a moderator can request to determine whether any of the participants is using more than one screen at a specified time and the conferencing module 320 can perform the determination and notify the moderator of any participant who is using more than one screen at the specified time. A moderator may also request that the conferencing module 320 monitor participants' use of screens (e.g., use of devices associated with each participant via presence information) to determine whether a participant begins to use an additional screen during a video conference call. The conferencing module 320 may manage additional screens in any manner, including automatically or using input from a user. For example, a moderator can request that if any of the participants start using any additional screen during a video conference call, that the conferencing module 320 notify the moderator and automatically provide a screen share of the additional screen(s). Such embodiments are advantageous because a moderator can monitor participants' use of screens (including participants' actions on the screens) even when they are already viewing a screen share of one of the participant's screens (or are already viewing a screen share of multiple screens associated with a participant, and/or are already viewing any group of screen shares). According to some embodiments disclosed herein, in a testing environment that is conducted via a video conferencing call, a moderator or proctor may advantageously be able to monitor students' use of any screens during the test time. In addition, a moderator may advantageously be able to more completely monitor students actions by viewing video feed of the student themselves (e.g., via students webcams) together with viewing screen shares of any screens that the students are using. This can also be advantageous in other classroom environments that are conducted via video conferencing because a moderator may be able to view students' work as the students' are completing that work (e.g., working on academic problems on their respective devices), and the moderator can more efficiently and effectively view the work because the moderator can view multiple screen shares at a same time. Such advantageous effects can reduce or eliminate the problems that a moderator may have if the moderator can only view one screen share at a time, which would be slow and time consuming for a moderator to switch between (and monitor) multiple screens within a limited time frame.

The conferencing module 320 may configure audio and video information and the screen share information in any manner, including automatically and using user input. For example, a moderator may be able to select to view all screen shares of all screens being used during the video conference (including any multiple screens being used by a single participant), all screen shares of all participants' screens together with all audio/video information (e.g., video feeds from webcams of each participant), or to view only some of the screen shares, and the moderator may specify which of the screen shares to view at a time. Thus, a moderator may be able to select any information from an audio/video channel to view at a same time with any information from a screen share channel. A moderator may change the configuration of information being displayed at any time. The information displayed may be labeled (or not labeled) and organized in any manner. For example, participants may name themselves and/or their devices and screens, or the conferencing module 320 may provide appropriate names/labels to label the information that is displayed on a moderator's display. As discussed herein, such embodiments can be advantageous because a moderator can more efficiently and effectively view multiple screen shares at a same time (and, if desired, one or more video feeds at the same time as the multiple screen shares) and easily determine and track which information they are viewing. Such advantageous effects can reduce or eliminate the problems that a moderator may have if the moderator can only view one screen share at a time, which would be slow and time consuming for a moderator to switch between (and monitor) multiple screens within a limited time frame.

Figure 4A:
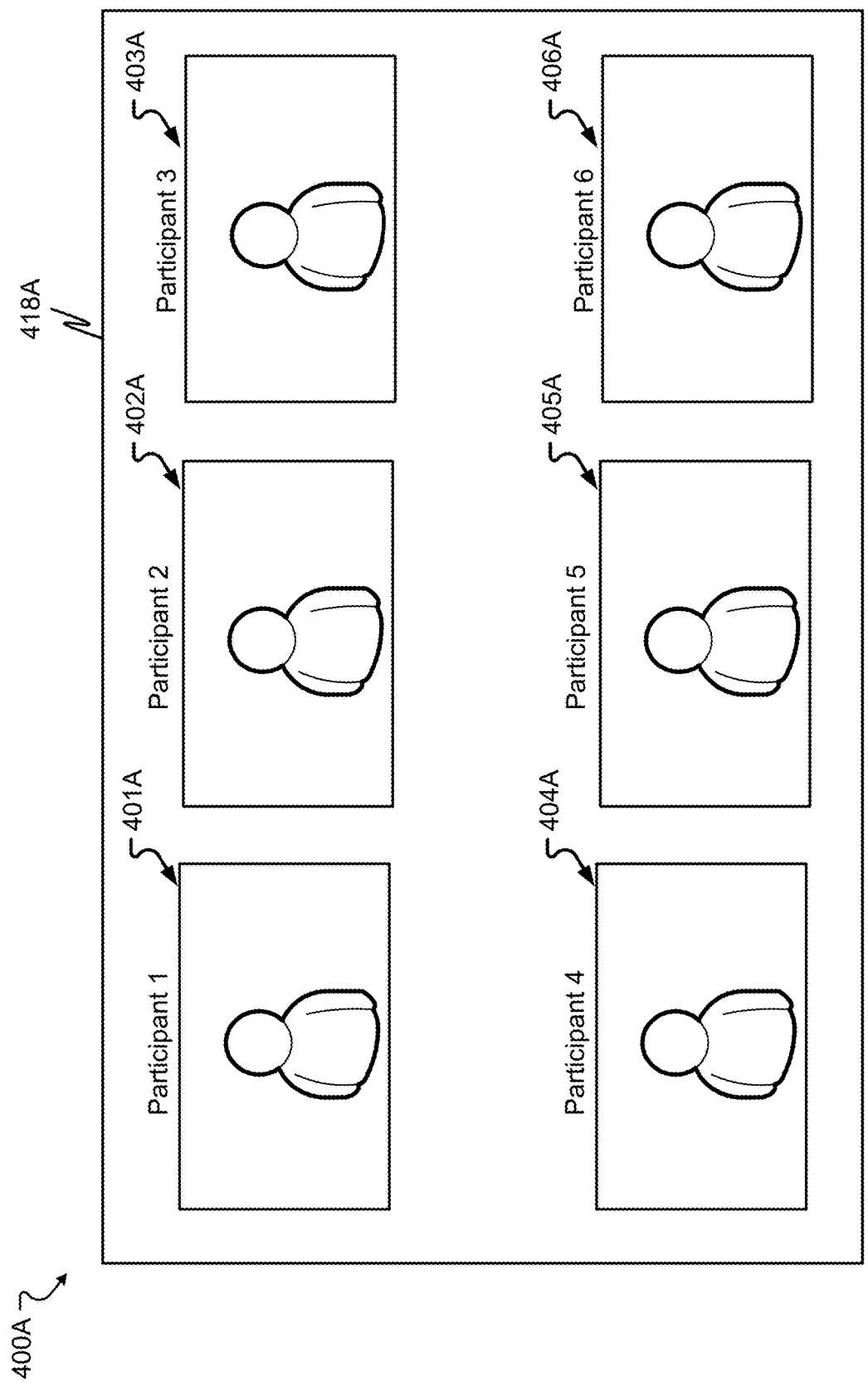
FIG. 4A shows an illustrative fourth block diagram in accordance with various embodiments of the present disclosure.

FIG. 4A is a screen 400A depicting additional illustrative details of methods and systems in accordance with at least some embodiments of the present disclosure. In some aspects, the components shown in FIG. 4A may correspond to like components discussed in other figures disclosed herein.

In FIG. 4A, screen 400A shows a display 418A showing different participants of a video conference. In various embodiments, the participant displays 1-6 401A-406A (e.g., showing a participant in each of the displays) may be referred to herein as windows (and/or a display may contain one or more windows within the display); thus, the participants of the video conference may be shown within windows 401A-406A within the display 418A. The display 418A may be referred to as a window, a view, or a layout and may take up an entirety or only a portion of screen 400A. In FIG. 4A, there are six participants participating in the video conference, including participant 1 in window 401A, participant 2 in window 402A, participant 3 in window 403A, participant 4 in window 404A, participant 5 in window 405A, and participant 6 in window 406A.

In some aspects, a display such as display 418A is displayed to one or more of each of the participants in the video conference (e.g., on a communication device of participant 1 (not shown), on a communication device of participant 2 (not shown), on a communication device of participant 3 (not shown), on a communication device of participant 4 (not shown), on a communication device of participant 5 (not shown), and/or on a communication device of participant 6 (not shown)). In alternative embodiments, display 418A may be shown to only one or some of the participants of the video conference (e.g., different participants may be shown different layouts). In various embodiments, one or more moderators may be one or more of the participants 1-6. In other embodiments, a moderator may be managing the video conference but may not be shown on the screen as one of the participants 1-6 (e.g., there may be seven participants so that a moderator may be a participant 7 who is not shown on display 418A). One or more moderators of the video conference may manage the video conference as described herein, including selecting which screens to display to which participants, and whether any screen shares are displayed to any participants (and/or recorded). Thus, FIG. 4A may show participants 1-6 on screens 401A-406A (e.g., respective video feeds of each of participants 1-6), as managed (e.g., selected and controlled) by the moderator.

In FIG. 4A, the six participants (e.g., participants 1-6 401A-406A) are engaged in a video conferencing session and discussing information that relates to actions that each participant is performing on their individual screen. For example, in some embodiments, the participants 1-6 401A-406A are engaged in a classroom setting, where each of the participants 106 401A-406A is a student and the moderator, who is the teacher, is conducting the video conferencing session. Display 418A is the teacher's display, and the teacher is viewing video feeds of the students (e.g., participants 1-6 401A-406A). The moderator controls the display 418A and chooses whether to view the students and/or the students' screen shares, as described further herein.

Figure 4B:
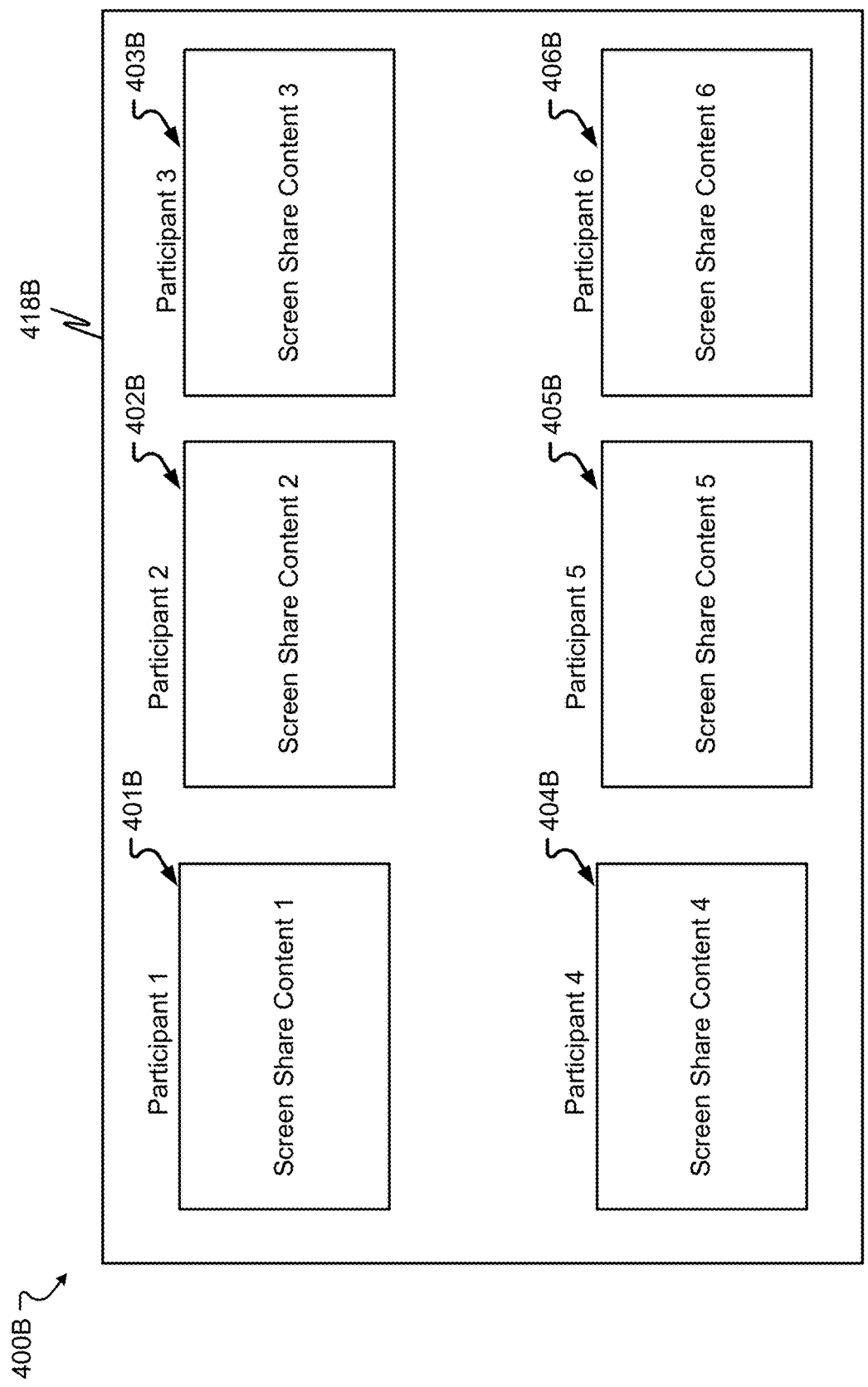
FIG. 4B shows an illustrative fifth block diagram in accordance with various embodiments of the present disclosure.

FIG. 4B is a screen 400B depicting additional illustrative details of methods and systems in accordance with at least some embodiments of the present disclosure. In some aspects, the components shown in FIG. 4B may correspond to like components discussed in other figures disclosed herein.

In FIG. 4B, screen 400B shows a display 418B showing different participants' displays within a video conference. In various embodiments, the participant displays (e.g., showing screen share content 1-6 401B-406B) may be referred to herein as windows. The screen share content 1-6 401B-406B may correspond to each of the respective participants shown in FIG. 4A. Thus, the screen shares of the participants of the video conference (e.g., screen share content 1-6 401B-406B) are shown within windows within the display 418B. The display 418B may be referred to as a window, a view, or a layout and may take up an entirety or only a portion of screen 400B. In FIG. 4B, there are six participants participating in the video conference and a screen share is displayed for each of the participants, including screen share content 1 in window 401B, screen share content 2 in window 402B, screen share content 3 in window 403B, screen share content 4 in window 404B, screen share content 5 in window 405B, and screen share content 6 in window 406B.

Continuing with the classroom example of FIG. 4A, the six participants that correspond to each of the screen share content 1-6 401B-406B (e.g., participants 1-6 401A-406A) are engaged in the video conferencing session and performing actions on their respective individual screen. The teacher determines that it would be advantageous to view each of the student's work (e.g., the actions they are performing in their respective individual screens) as the students are working at a same time. Thus, the moderator (e.g., the teacher) can manage the display 418B to view screen shares of each participants' screen showing their work, as they are all working at the same time. In various embodiments, all of the screen share content (e.g., screen share content 1-6 401B-406B) is shown in real-time at the same time. The teacher advantageously views the work that the students are performing (e.g., screen share content 1-6 401B-406B) in real time and at the same time. The moderator (e.g., the teacher) controls the display 418B and chooses whether to view the students and/or the students' screen shares, as described further herein.

Figure 4C:
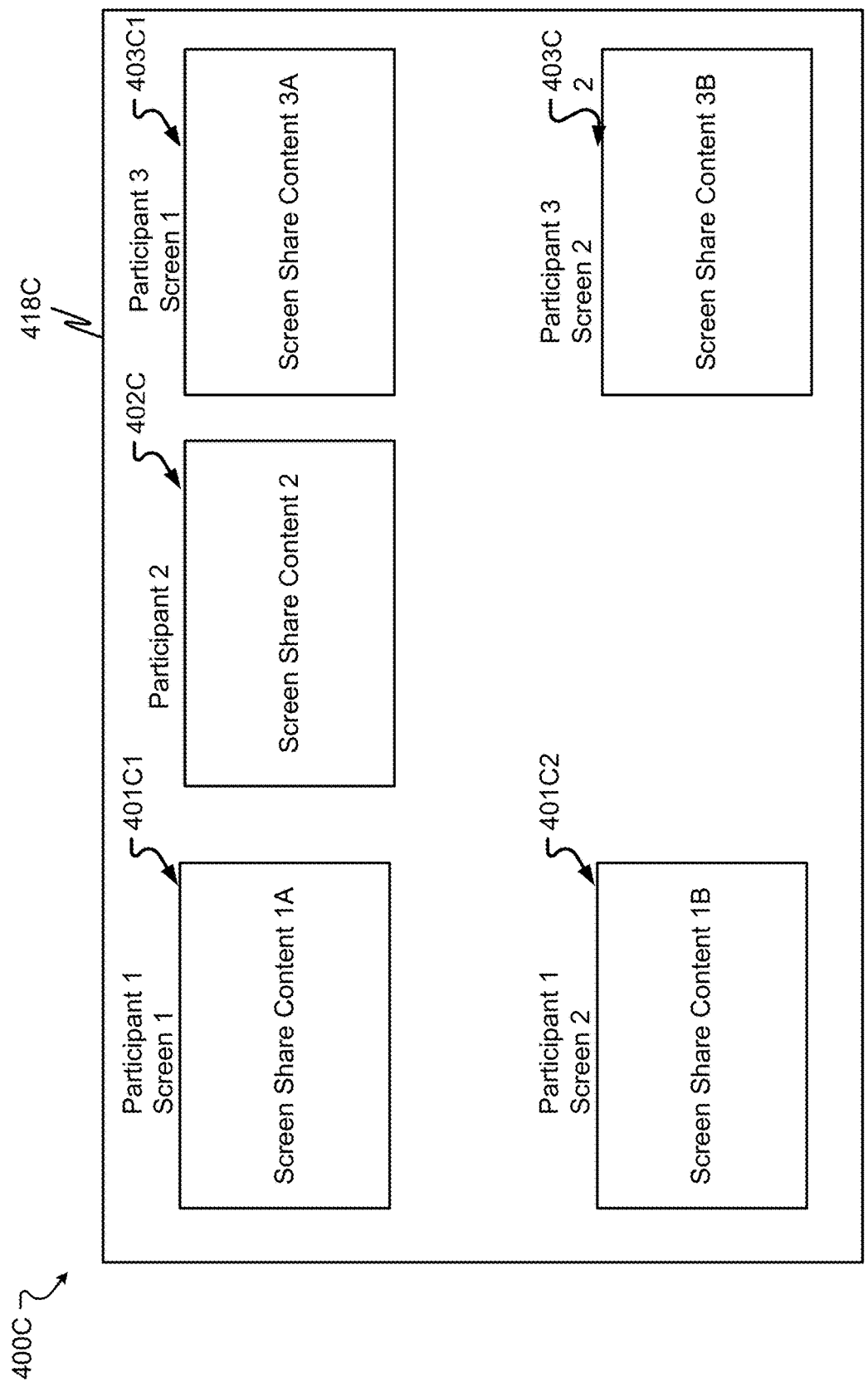
FIG. 4C shows an illustrative sixth block diagram in accordance with various embodiments of the present disclosure.

FIG. 4C is a screen 400C depicting additional illustrative details of methods and systems in accordance with at least some embodiments of the present disclosure. In some aspects, the components shown in FIG. 4C may correspond to like components discussed in other figures disclosed herein.

In FIG. 4C, screen 400C shows a display 418C showing some participants' screens in a video conference. In various embodiments, a moderator may control which screens are displayed at any time during the video conference, as well as what is displayed on the screen(s) (e.g., the participant(s) and/or screen share content).

In FIG. 4C, the moderator has chosen to view multiple screens for some of the participants. The moderator may have been notified that some of the participants are using more than one screen at the beginning of the video conferencing session and or during the video conferencing session. Alternatively, at any point in time during the video conferencing session, the moderator may have requested that the system notify the moderator if any of the participants are using (or if they start to use) more than one screen. The moderator may choose to show any one or more screens per participant, and/or any or all of the screens for all of the participants. The moderator may adjust what is shown on display 418C at any time during the video conferencing session.

Continuing with the classroom example of FIGS. 4A and 4B, there are six participants that are engaged in the video conferencing session and performing actions on their respective individual screen. The teacher (e.g., the moderator) begins an exam that all of the students will take, in real-time. Thus, the moderator determines that they should be able to view screen share content of any screens that the students are using, and the teacher requests that the system determine whether any of the students are using more than one screen. The system determines that participant 1, participant 3, and participant 4 are each using two screens, and notifies the teacher of this. The teacher requests to view screen shares of all of the screens being used by participants 1-3 at a same time on the teacher's display 418C as the exam begins because the teacher wants to monitor what the students are doing on the screens that they are using. However, the teacher needs the screen shares to be large enough that the teacher can determine what content is on each screen share. Thus, the teacher chooses only participants 1-3 to display on screen 418C at a same time and in real time. Display 418C shows five screen share contents 1A-3A, 1B, and 3B, for participants 1-3 at the same time and in real-time because participant 1 is using two screens (e.g., participant 1 screen 1 401C1 and participant 1 screen 2 401C2) and participant 3 is also using two screens (e.g., participant 3 screen 1 403C1 and participant 3 screen 2 403C2). The teacher can view sufficient detail on the displayed screens since there are only five screen shares shown on display 418C (e.g., screen share content 1A 401C1, screen share content 1B 401C2, screen share content 2 402C, screen share content 3A 403C1, and screen share content 3B 403C2) and the teacher can advantageously view all the screens that each of participants 1-3 is using during the exam.

Figure 4D:
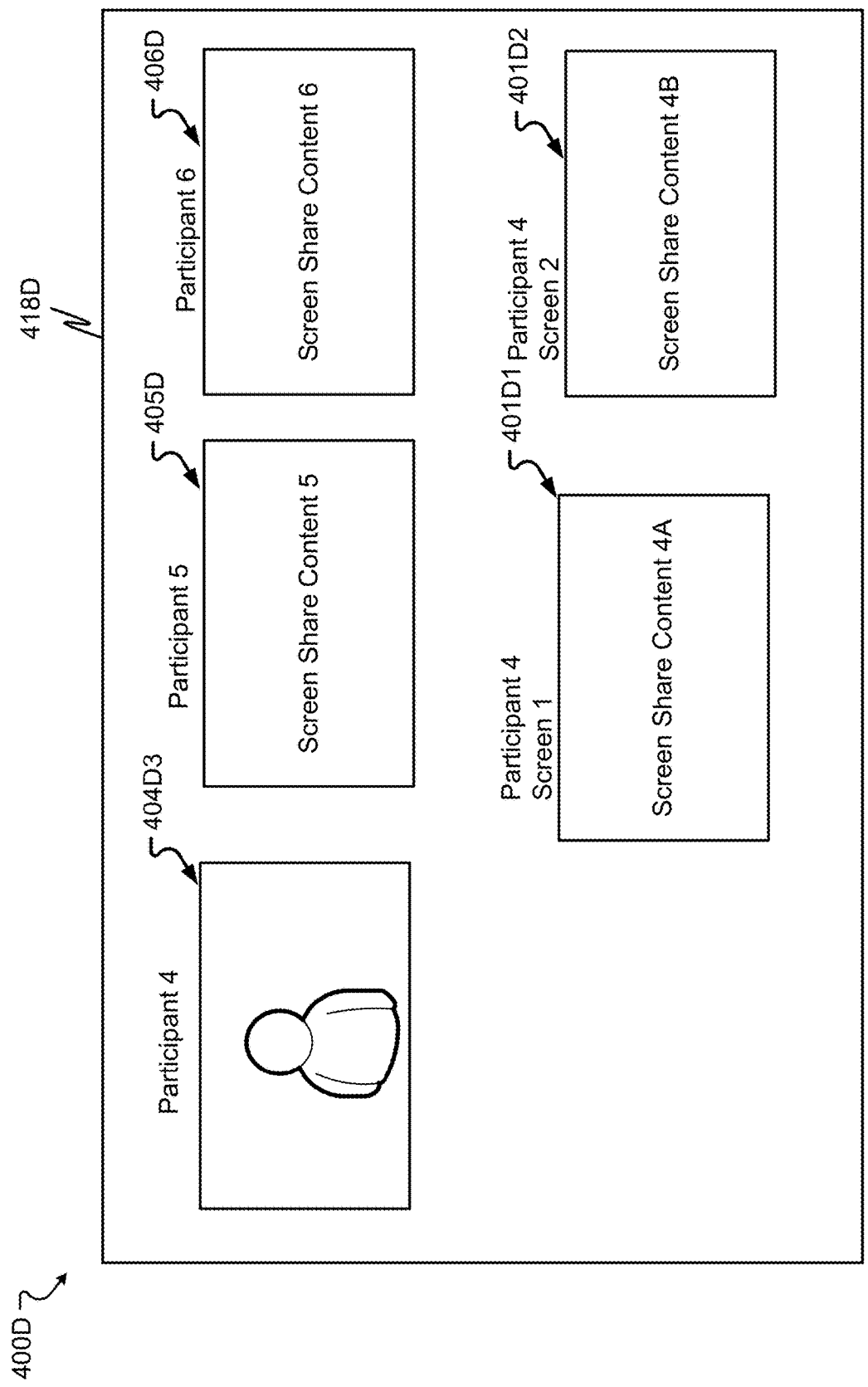
FIG. 4D shows an illustrative seventh block diagram in accordance with various embodiments of the present disclosure.

In FIG. 4D, screen 400D shows a display 418D showing some participants' screens in a video conference, similar to FIG. 4C. In various embodiments, a moderator may control which screens are displayed at any time during the video conference, as well as what is displayed on the screen(s) (e.g., the participant(s) and/or screen share content).

Continuing with the example illustrative embodiments of FIGS. 4A-4C, in FIG. 4C the moderator chose to view all screen share content of any screens associated with participants 1-3, and in FIG. 4D the moderator chooses to view all screen share content of any screen associated with participants 4-6, as well as to view the video feed of participant 4. As discussed herein, the moderator may have been notified that some of the participants are using more than one screen at the beginning of the video conferencing session and or during the video conferencing session. Alternatively, at any point in time during the video conferencing session, the moderator may have requested that the system notify the moderator if any of the participants are using (or if they start to use) more than one screen. The moderator may choose to show any one or more screens per participant, and/or any or all of the screens for all of the participants. The moderator may adjust what is shown on display 418D at any time during the video conferencing session.

Continuing with the classroom example the system had determined that only participants 1, 3, and 4 are each using two screens, and the teacher was notified. In FIG. 4C, the teacher viewed screen shares of all of the screens being used by participants 1-3 at a same time on the teacher's display 418D as the exam began. In FIG. 4D, the teacher chooses to view screens associated with participants 4-6. In particular, the teacher chooses to view all screen share content of any screen associated with participants 4-6, as well as to view the video feed of participant 4 because the teacher wants to monitor what the students are doing on the screens that they are using. Thus, the teacher selects to view the screen share content of the screens of participants 6 (e.g., screen share content 4A 401D1, screen share content 4B 401D2, screen share content 5 405D, and screen share content 6 406D) at a same time during the exam. The teacher also wants to see what participant 4 is doing during the exam, and so the teacher chooses to view the video feed of participant 404D3. The teacher can view sufficient detail on the displayed screens since there are only five screens shown on display 418D (e.g., participant 4 404D3, screen share content 4A 404D1, screen share content 4B 404D2, screen share content 5 405D, and screen share content 6 406D) and the teacher can advantageously view all the screens that each of participants 4-6 is using during the exam. As discussed herein, the teacher (e.g., a moderator) can advantageously choose to configure the data being received and viewed (including any multiple screens and/or multiple video feeds per participant) as desired.

Advantageously, the video conference displays discussed in FIGS. 4A-4D show that the displays can show information from multiple channels including a screen share channel at a same time during a video conference and the screen share channel may be available to (e.g., provided to) only a moderator to view and manage. One of the participants (e.g., a moderator) may customize what information is shown, determine if a participant is using multiple screens, choose to display any of the screen shares on one display at a same time (including multiple screen shares per participant), and the displays, information, and screen shares are fully configurable. These embodiments allow for improved communications and more efficient and effective screen sharing capabilities and more efficient and effective information management. Further advantageous effects are described through the present application.

Figure 5:
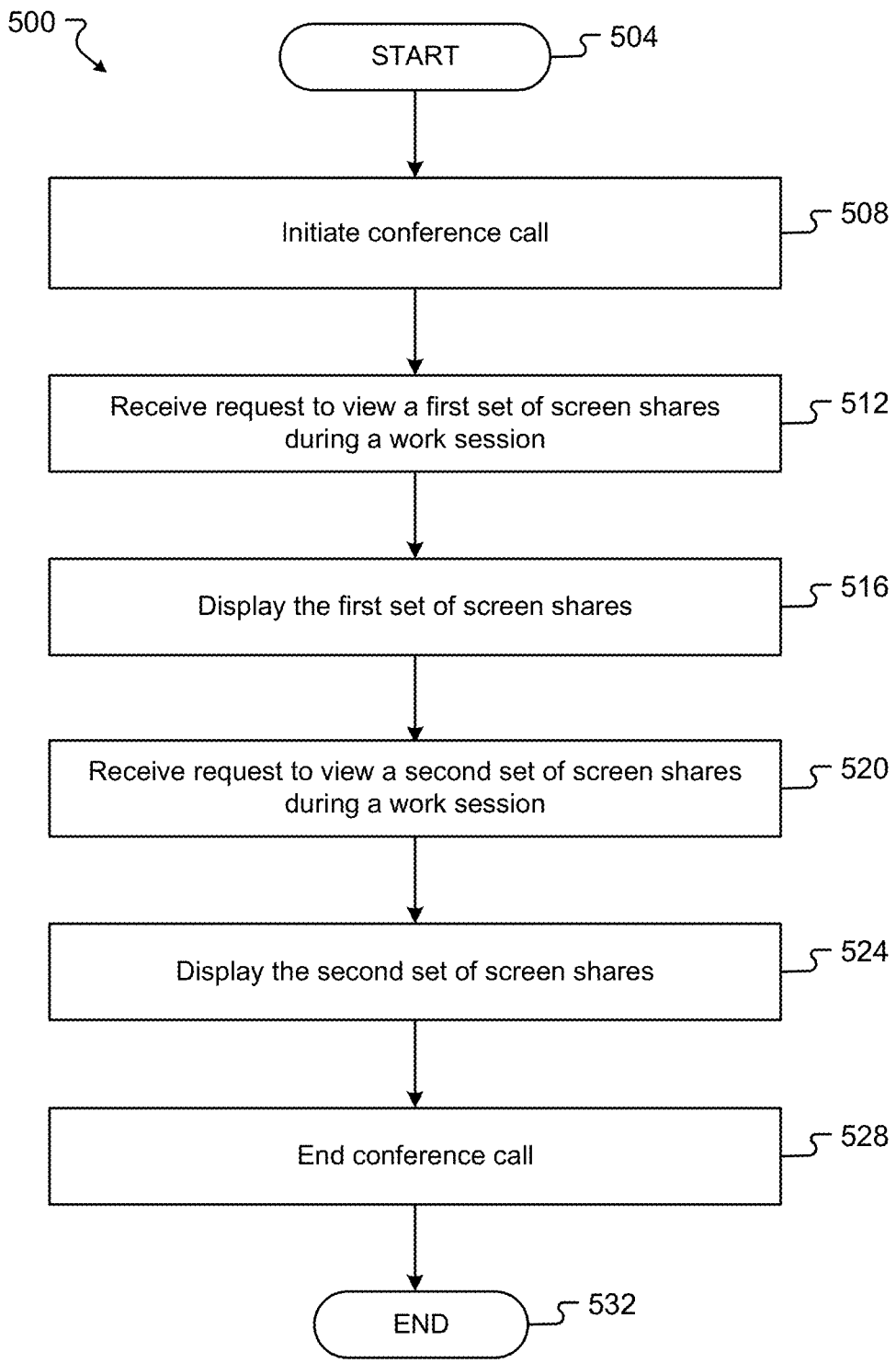
FIG. 5 shows an illustrative first flow diagram in accordance with various embodiments of the present disclosure.

FIG. 5 is an illustrative flow diagram of a method 500. The method starts at step 504 and in step 508, a video conference call is initiated. In illustrative embodiments, there are seven participants in the video conference call, and one of the participants is the moderator of the video conference call. A request to view a first set of screen shares during a work session is received at step 512. For example, the moderator (e.g., one of the participants) may send the request to a conferencing module of a conferencing server (e.g., conferencing module 320 of conference server 140) to view the first set of screen shares. In step 516, the first set of screen shares are displayed. In other words, the conferencing module may receive the request and use a screen share channel to send the requested screen share information to the moderator. The conferencing module may configure the screen sharing information according to the moderator's request.

As one illustrative example, the video conference call may be a work session that is a teaching session having one teacher and six students, and the moderator may be the teacher of the teaching session. Each of the six students may be using one screen; thus, there may be one screen share per participant (excluding the teacher, who is viewing the students screen shares). Thus, the moderator, in step 516, may view displayed screen share content that is similar to that shown in FIG. 4B.

In step 520, a request is received (e.g., by a conferencing module of a conference server) to view a second set of screen shares during a work session. The request may or may not include a request to display other information, such as video feeds of any one or more of the participants. The request may be made by the moderator and may be made at any timing during the video conference.

Continuing with the illustrative example, the work session may proceed during the video conference call to include an exam session, and the teacher may proctor the exam. In order to proctor the exam, the teacher may want to view specific screen shares (and/or video feeds) of one or more of the participants, which is entirely configurable by the teacher. The system (e.g., the conferencing module) may process the request and the second set of screen shares is displayed in step 524. Advantageously, the teacher may view what the students are working on, via the screen shares, as they are performing the work. In other embodiments, the teacher, in step 524, may view any requested audio/video content and screen share content on the display at a same time. The information shown on the display may be similar to that shown in FIG. 4D. Therefore, advantageously, if the teacher is proctoring an exam, the teacher may view multiple student's work as they are completing their work in real time during the exam, and other students cannot view each other's screen shares. Additionally, the teacher may view any requested student's video feed (e.g., via a webcam) to watch the student themselves to view their actions in real time and at a same time during the video conference call as the teacher is also viewing their screen share. At step 528, the video conference call ends and the method ends at step 532.

Figure 6:
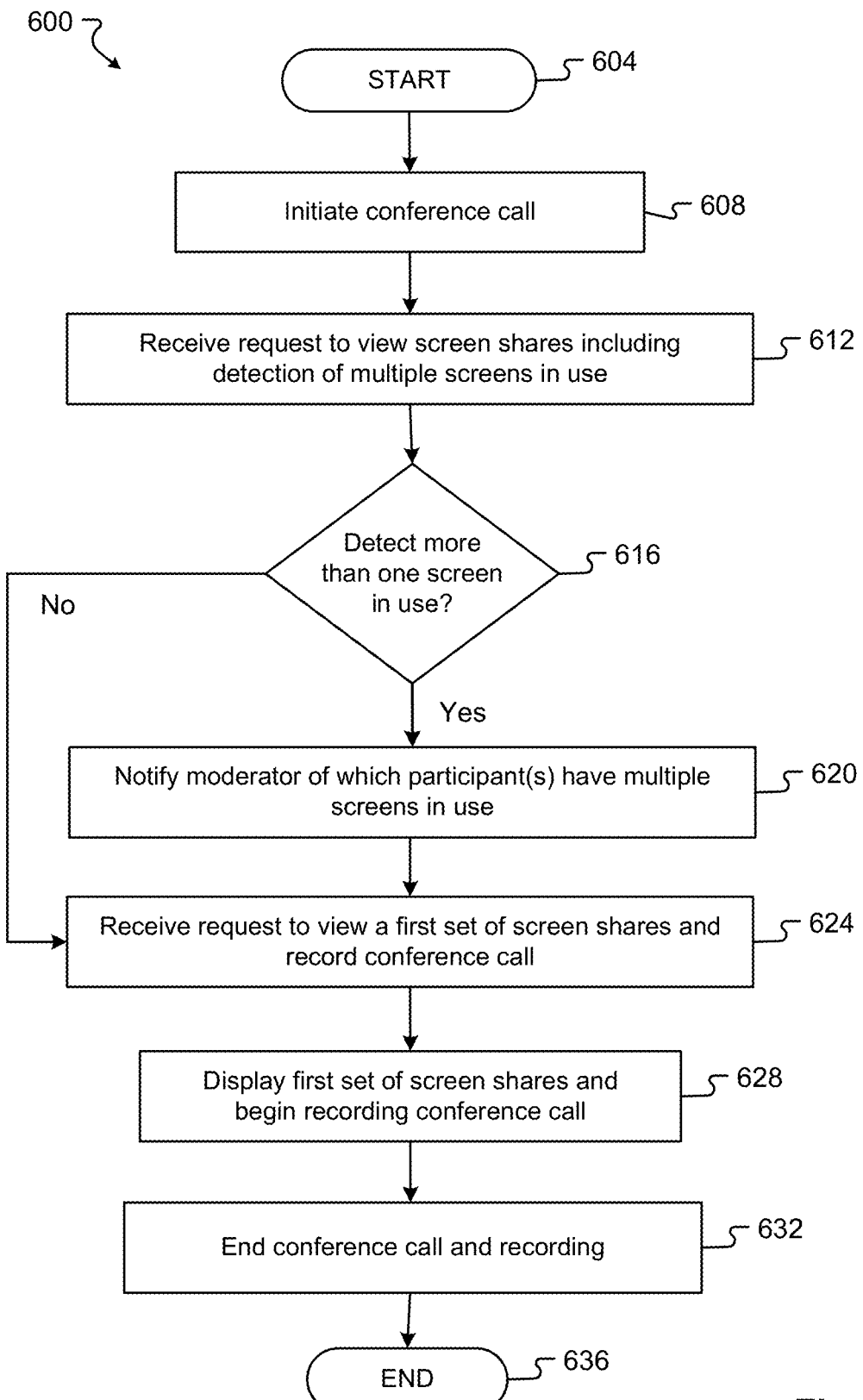
FIG. 6 shows an illustrative second flow diagram in accordance with various embodiments of the present disclosure.

FIG. 6 is an illustrative flow diagram of a method 600. The method starts at step 604 and in step 608, a video conference call is initiated. In illustrative embodiments, and similarly to the illustrative example provided with respect to FIG. 5, there are seven participants in the video conference call, and one of the participants is the moderator of the video conference call. A request to view a first set of screen shares and to detect any multiple screens in use is received during the video conference call at step 612. The steps of FIG. 6 may processed by a conferencing module of a conferencing server (e.g., conferencing module 320 of conference server 140). At step 616, the method (e.g., a conferencing module) proceeds to detect if more than one screen per participant is in use. If more than one screen per participant is in use (in other words, at least one of the participants is using more than one screen at the time of the request), then the method proceeds to step 620 and the moderator may be notified of which of the participants is using multiple screens. After the moderator is notified, or if not more than one screen in use per participant was detected at step 616, then the method proceeds to step 624 and a request to view a first set of screen shares, and to record the video conference call, is received. At step 628, the first set of screen shares are displayed and the video conference call recording begins.

In illustrative embodiments where the moderator is notified that at least one participant is using an additional screen, the first set of screen shares that is displayed per the moderator's request may look like the display shown in FIG. 4C where two of the participants are each using two screens, and the moderator has selected to view screen shares for three participants (including the two participants each using two screens) in the first set of screen shares. Thus, the moderator may advantageously view all of the multiple screens being used by the two participants, as well as a screen share of one other participant. Advantageously, the moderator is able to view all of this information in real time, on a single display, and at a same time during the video conference call. In some embodiments, this may correspond to an exam work session, where a teacher is viewing multiple students' screen shares (including any additional screens being used by a student) at a same time, in real time, during the exam. The teacher is advantageously able to configure how many screen shares (or how much information including video feeds) is shown on a single display so that the teacher can view sufficient detail of the content of the screen shares (and/or sufficient detail of any other information that is on the screen). The recording of the conference call may record information that is on the display of the moderator (together with any other information transmitted during the video conference) so that the moderator advantageously has a recorded copy of the video conference. In various embodiments, the recording of the conference call may record information that is also not on the display of the moderator (e.g., video channels of each participant may be recorded and/or screen share channels of each participant, including any multiple screen shares per participant, may be recorded). As discussed herein, even if the moderator is changing the channels being received by any of the participants (including changing which video feeds and screen shares that the moderator themselves is viewing), recordings of the data may be continuous (e.g., the system may record data independently from other actions occurring during the video conference call). Said another way, the recordings can be continuous during the conference, regardless of any views being chosen by a moderator. At step 632, the video conference call ends and the method ends at step 636.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In other embodiments, the hardware component may include a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally, or alternative, the machine-readable instructions may be accessible to the microprocessor and encoded in a media or device as magnetic fields, voltage values, charge values, reflective/non-reflective portions, and/or physical indicia.

In some embodiments, the microprocessor further includes one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may include, a central processing unit (CPU) with data values encoded in an instruction register (or other circuitry maintaining instructions) or data values including memory locations, which in turn include values utilized as instructions. The memory locations may further include a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In some embodiments, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may include task-specific allocation of processing tasks and/or shared or distributed processing tasks. In yet further embodiments, a microprocessor may execute software to provide the services to emulate a different microprocessor or microprocessors. As a result, first microprocessor, included of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically. They may also be performed continuously and semi-automatically (e.g., with some human interaction). They may also not be performed continuously.

The illustrative systems and methods of this disclosure have been described in relation to communications systems and components and methods for monitoring, enhancing, and embellishing communications and messages. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the illustrative embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In some embodiments, the components may be physical or logically distributed across a plurality of components (e.g., a microprocessor may include a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet further embodiments, the systems and methods of this disclosure can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Illustrative hardware that can be used for the present disclosure includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet further embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In additional embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein including software are executed, or stored for subsequent execution, by one or more microprocessors and are executed as executable code. The executable code being selected to execute instructions that include the particular embodiment. The instructions executed being a constrained set of instructions selected from the discrete set of native instructions understood by the microprocessor and, prior to execution, committed to microprocessor-accessible memory. In some embodiments, human-readable "source code" software, prior to execution by the one or more microprocessors, is first converted to system software to include a platform (e.g., computer, microprocessor, database, etc.) specific set of instructions selected from the platform's native instruction set.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:
   initiating, by a processor, a conference call with a plurality of participants;
   receiving, by the processor, a first request from a third participant to view at least a first screen share of a first participant and a second screen share of a second participant at a first same time on a device of the third participant,
   wherein the plurality of participants comprises the first participant, the second participant, and the third participant;
   detecting, by the processor, that the first participant, the second participant or both the first and second participants are using more than one screen at the first same time based on the first request from the third participant; and
   displaying, by the processor, the first screen share and the second screen share, each including the more than one screen, at the first same time on a display of the device of the third participant based on the detection that the first participant, the second participant or both the first and second participants are using more than one screen at the first same time.

2. The method of claim 1, wherein the first same time is in real time and during the conference call.

3. The method of claim 1, wherein the third participant is a moderator of the conference call, and wherein the moderator sends the first request.

4. The method of claim 1, further comprising:
   detecting that the first participant is using more than one screen at the first same time and notifying the third participant of the more than one screen.

5. The method of claim 4, further comprising:
   receiving a second request, by the third participant, to view a third screen share of the more than one screen; and
   displaying, by the processor, the third screen share together with the first screen share and the second screen share on the device of the third participant.

6. The method of claim 4, wherein the first request specifies to view only some screen shares of all screens being used by the plurality of participants.

7. The method of claim 1, wherein the first request is to view all screen shares of every one of the participants in the plurality of participants at a second same time on the device of the third participant, wherein the all screen shares comprise the first screen share, the second screen share, and at least a third screen share.

8. The method of claim 1, further comprising:
   after the displaying at the first same time, detecting that the first participant is using at least a first screen and at least a second screen at a second same time and notifying the third participant of the first participant using the at least the first screen and the at least second screen at the second same time.

9. The method of claim 8, further comprising:
   receiving a second request, by the third participant, to view a fourth screen share of the at least first screen and a fifth screen share of the at least second screen; and
   displaying, by the processor, the fourth screen share and the fifth screen share together with the first screen share and the second screen share on the device of the third participant at a third same time,
   wherein the third same time is in real time.

10. The method of claim 1, wherein a moderator sends the first request, and further comprising:
    after the displaying at the first same time, receiving a second request to view all screen shares of every one of the participants in the plurality of participants at a second same time on the device of the third participant, wherein the all screen shares comprise the first screen share, the second screen share, and at least a third screen share; and
    displaying the first screen share, the second screen share, and at least the third screen share on the device of a third participant in real time during the conference call.

11. The method of claim 1, further comprising:
    receiving a second request to start recording the conference call, wherein the recording comprises a recording of the display of the device of the third participant displaying the first screen share and the second screen share at the first same time.

12. The method of claim 11, wherein the first request further comprises to view a video feed of the first participant together with the first screen share and the second screen share at the first same time on the display of the device of the third participant.

13. A system, comprising:
    a processor; and
    a memory coupled with and readable by the processor and having stored therein a set of instructions which, when executed by the processor, causes the processor to manage a conference call by:
    initiating the conference call with a plurality of participants;
    receiving a first request from a third participant to view at least a first screen share of a first participant and a second screen share of a second participant at a first same time on a device of the third participant,
    wherein the plurality of participants comprises the first participant, the second participant, and the third participant;
    detecting that the first participant, the second participant or both the first and second participants are using more than one screen at the first same time based on the first request from the third participant; and
    displaying the first screen share and the second screen share, each including the more than one screen, at the first same time on a display of the device of the third participant based on the detection that the first participant, the second participant or both the first and second participants are using more than one screen at the first same time.

14. The system of claim 13, wherein the first same time is in real time and during the conference call.

15. The system of claim 13, wherein the third participant is a moderator of the conference call, and wherein the moderator sends the first request.

16. The system of claim 13, further comprising:
    detecting that the first participant is using more than one screen at the first same time and notifying the third participant of the more than one screen.

17. The system of claim 16, further comprising:
    receiving a second request, by the third participant, to view a third screen share of the more than one screen; and
    displaying, by the processor, the third screen share together with the first screen share and the second screen share on the device of the third participant.

18. The system of claim 13, wherein the first request is to view all screen shares of every one of the participants in the plurality of participants at a second same time on the device of the third participant, wherein the all screen shares comprise the first screen share, the second screen share, and at least a third screen share.

19. The system of claim 13, further comprising:
after the displaying at the first same time, detecting that the first participant is using at least a first screen and a second screen at a second same time and notifying the third participant of the first participant using the at least the first screen and the second screen at the second same time.

20. A computer-readable storage device comprising a set of instructions stored therein which, when executed by a processor, causes the processor to manage a conference call by:
initiating the conference call with a plurality of participants;
receiving a first request from a third participant to view at least a first screen share of a first participant and a second screen share of a second participant at a first same time on a device of the third participant,
wherein the plurality of participants comprises the first participant, the second participant, and the third participant;
detecting that the first participant, the second participant or both the first and second participants are using more than one screen at the first same time based on the first request from the third participant; and displaying the first screen share and the second screen share, each including the more than one screen, at the first same time on a display of the device of the third participant based on the detection that the first participant, the second participant or both the first and second participants are using more than one screen at the first same time.

* * * * *